United States Patent [19]

Belter

[11] Patent Number: 4,534,572
[45] Date of Patent: Aug. 13, 1985

[54] PORT BAFFLE FOR ENGINE GASKET

[75] Inventor: Jerome G. Belter, Mt. Prospect, Ill.

[73] Assignee: Dana Corporation, Toledo, Ohio

[21] Appl. No.: 684,302

[22] Filed: Dec. 20, 1984

[51] Int. Cl.³ .............................................. F16J 15/12
[52] U.S. Cl. .................... 277/235 B; 277/22
[58] Field of Search ................ 277/235 R, 235 B, 22, 277/165; 123/198 R, 198 B

[56]  References Cited
U.S. PATENT DOCUMENTS

| | | | |
|---|---|---|---|
| 3,168,961 | 2/1965 | Yates | 220/60 |
| 3,262,599 | 7/1966 | Muller | 220/24.5 |
| 4,046,168 | 9/1977 | Milne | 138/89 |
| 4,140,323 | 2/1979 | Jacobs | 277/235 B |
| 4,405,138 | 9/1983 | Skrycki | 277/235 B |
| 4,423,753 | 1/1984 | Smith et al. | 138/89 |
| 4,505,486 | 3/1985 | Skrycki | 277/235 B |

Primary Examiner—Robert I. Smith
Attorney, Agent, or Firm—F. B. McDonald

[57] ABSTRACT

A port baffle provides a simple system for the closure and sealing of a manifold gasket aperture. In a preferred form, the port baffle is made of a resilient plastic material, preferably a glass-filled nylon. A baffle is comprised of a pair of plate-like members joined together by mating post and socket connector elements integrally affixed to adjoining faces of the members. The mating post and socket connector elements provide a press-fit retention system, and in the preferred embodiment, each plate contains only one mating post and one mating socket connector element.

14 Claims, 3 Drawing Figures

PORT BAFFLE FOR ENGINE GASKET

BACKGROUND OF THE INVENTION

This invention relates to gasket manufacture, and particularly to the use of port baffles designed to be inserted and retained within gasket apertures. Traditional systems of the prior art have relied on the use of stainless-steel to provide for the closure and sealing of port apertures within gaskets. In the automotive industry, engines are often interchangeably used in various styles and models of vehicles. It is often desirable and appropriate to use engine gaskets having different aperture patterns for different vehicles. Thus, for example, engine manifold gaskets are often made to include standard patterns of apertures within gaskets for particular model applications. Modification of a gasket often requires the use of special devices to either restrict a certain gasket aperture or to fully close off the gasket aperture, the latter being done by the use of a port baffle. The use of stainless-steel plates for "baffling" has required unnecessary expense, in addition to the use of complicated and/or expensive attachment methods, such as by the use of welding.

SUMMARY OF THE INVENTION

The invention disclosed herein provides a port baffle formed of plastic and/or other resilient material considerably less costly than stainless steel. Moreover, the baffle disclosed herein provides a system wherein integral resilient connector elements are utilized to create a simple and inexpensive coupling system heretofore unavailable in the devices utilizing stainless steel baffles.

In a preferred form, the port baffle of the present invention includes a pair of plate-like members formed of a resilient material and having adjoining faces mechanically coupled together by mating post and socket connector elements. In a preferred embodiment, the resilient material is a glass-filled nylon, and the plates are made identically, with one post and one socket connector element on each. A press-fit retention coupling system is effected by turning one of the plates 180° relative to the other whereby the post of one plate engages the socket of the other and vice versa.

DETAILED DESCRIPTION OF A PREFERRED EMBODIMENT

Figure 1:
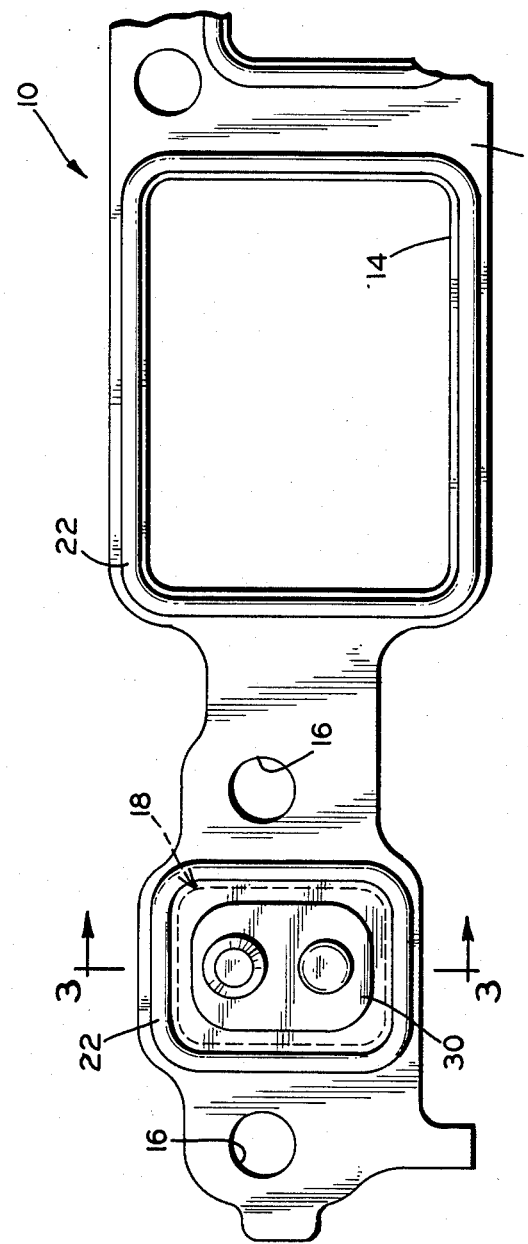
FIG. 1 is a plan view, partially fragmented, of an intake manifold gasket containing a port baffle constructed in accordance with the present invention.
Figure 3:
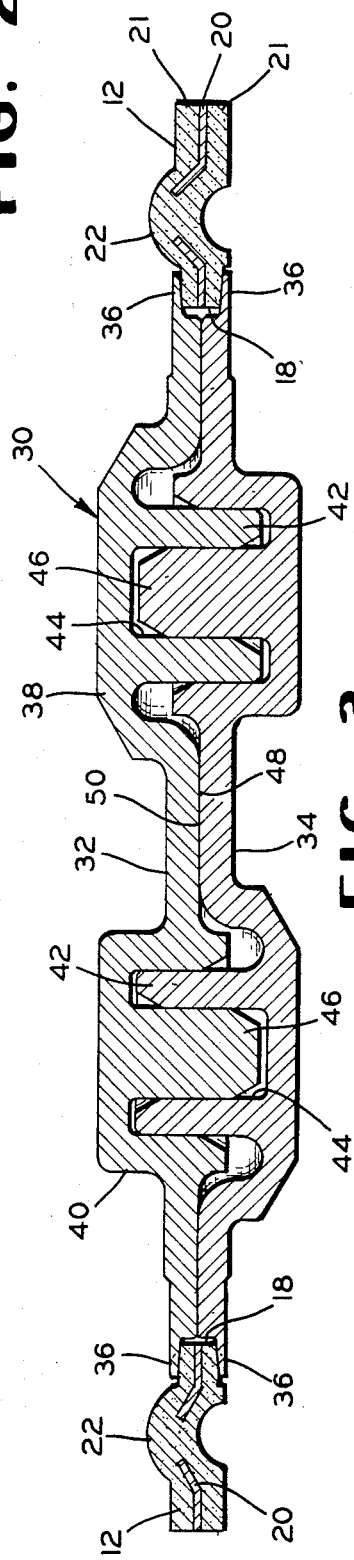
FIG. 3 is a cross sectional view of the port baffle of FIG. 1 taken along lines 3—3 thereof.

An air intake manifold gasket 10 as utilized in internal combustion engines is shown fragmentarily in FIG. 1. The gasket 10 defines a gasket body shown generally at 12 (FIGS. 1 and 3). As more apparent in FIG. 3, the gasket body 12 is fabricated of a perforated metal sheet core 20 containing a composition material 21 bonded to both sides of the sheet metal core 20. Typically, such composition material is made of a fibrous based, elastomer bound or an elastomer-asbestos material.

Referring specifically to FIG. 1, the gasket 10 includes a main air intake aperture 14 as well as a plurality of bolt hole apertures 16. The gasket 10 also includes a rear coolant port aperture 18 which contains a port baffle 30 constructed in accordance with the present invention. The baffle 30 is intended to modify an otherwise conventional gasket 10 by closing and sealing off the rear coolant port aperture 18. Circumferentially disposed about each of the afore-described coolant apertures 14 and 18 is a gasket bead 22 which operates to effectively seal the manifold at the aperture interface, per conventional practice.

Figure 2:
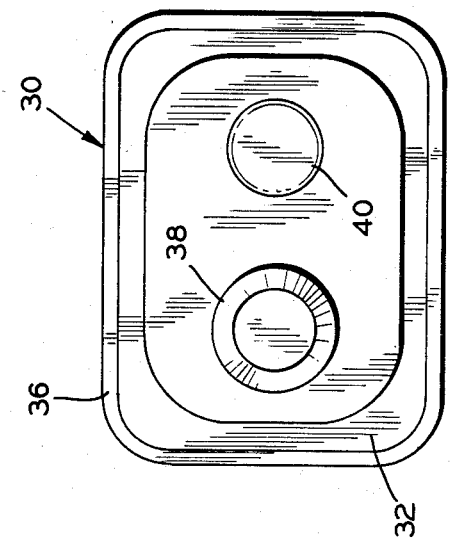
FIG. 2 is a face view of the port baffle of FIG. 1, removed from the gasket body for clarity.

Referring now to FIGS. 2 and 3, the rear port baffle 30 is shown in greater detail. The baffle 30 is constructed of a resilient material, preferably a glass-filled nylon or other resilient plastic, and includes a mating pair of top and bottom plate-like members 32 and 34, respectively. Each plate 32 and 34 includes a sealing periphery 36 which extends continuously thereabout for engaging the circumferentially extending edges of the port aperture 18 between the baffles to provide an air-tight seal. In the preferred embodiment, a socket-post connector system enables the two plate-like members 32 and 34 to be secured together in place within the aperture 18. For this purpose, each plate includes one socket support boss 38 and one post support boss 40, each recessed out the plane of the plate. Each socket support boss 38 contains a cylindrical socket connector 42 (shown in cross section in FIG. 3) which defines a bore 44 for receiving a mating post connector 46 therein to provide for press-fit coupling and retension together of plate members 32 and 34. Likewise, each post support boss 40 contains a post connector 46 for press-fit insertion into a mating socket connector 42. Under the construction of the preferred embodiment, the plates 32 and 34 may be fabricated identically, each one of the two plates containing one socket connector which receives a post connector from the other plate, and a post connector which inserts into a socket connector of the other plate. Upon mating the plates together via the press-fit socket and post connectors, the sealing peripheries 36 of the plates will automatically engage both sides of the circumferentially extending edge of the aperture 18 as indicated at FIG. 3.

In the preferred form, top and bottom adjoining faces 48 and 50, respectively, of the plates 32 and 34 will be in contact with each other upon the press-fitting together of the post and socket connector elements. This feature will ensure that the post connector 46 will never bottom out in the socket connector 42, and thus that the full frictional effects of post and socket connector coupling should always be achieved. In addition, the sealing peripheries 36 of the plates 32 and 34 will tend to clasp the edges of the aperture 18 to the fullest possible extent, as will be appreciated by those skilled in the art.

Although only one preferred embodiment of the present invention is shown and described herein, the following claims cover numerous variations of the invention which fall thereunder.

What is claimed is:

1. A port baffle for closing and sealing an aperture in a gasket, said baffle comprising a pair of plate-like members having adjoining faces disposed for establishing peripheral sealing engagement of opposing sides of said gasket about said aperture, said faces being mechanically coupled together by mating post and socket connector elements.

2. The port baffle of claim 1 wherein said mating post and socket connector elements comprise a press-fit retention system.

3. The port baffle of claim 2 wherein a post is contained on one of said pair of plate-like members and a socket is contained on the other of said pair of plate-like members, whereby each of said pair of plate-like members contains a post and a socket connector element, respectively.

4. The port baffle of claim 2 wherein said pair of plate-like members defines a pair of post and socket connector elements.

5. The port baffle of claim 4 wherein each one of said pair of plate-like members contains one post and one socket connector element thereon for establishing mating connection with the second of said members containing one mating socket for the post of said first member, and one mating post for the socket of said first member, whereby a dual connection system is established between said pair of plate-like members.

6. A port baffle of claim 5 wherein said pair of plate-like members are made of a resilient material.

7. A port baffle of claim 6 wherein said posts and sockets are integrally formed as part of said plate-like members.

8. The port baffle of claim 7 wherein said material of said members is plastic.

9. The port baffle of claim 7 wherein said material is a glass-filled nylon.

10. A port baffle for closing an aperture in a gasket, said baffle comprising a pair of plate-like members having adjoining faces disposed for establishing continuous peripheral engagement of opposing sides of said gasket about said aperture, said faces being mechanically coupled together by resilient mating post and socket connector elements, said elements comprising a press-fit retention system for effecting the coupling together of said plates, one post and one socket being contained on each of said plate-like members respectively.

11. The port baffle of claim 10 wherein said members are of a resilient material, and wherein said post and socket connector elements are integral with said members.

12. The port baffle of claim 11 wherein said resilient material is a glass-filled nylon.

13. The port baffle of claim 1 wherein said pair of opposing plate-like members are identical.

14. A gasket comprising an aperture, and a port baffle closing said aperture, said port baffle comprising a pair of plate-like members having adjoining faces disposed for establishing peripheral sealing engagement of opposing sides of said gasket about said aperture, said faces being mechanically coupled together by mating post and socket connector elements.

* * * * *